United States Patent [19]
Maute et al.

[11] Patent Number: 5,551,287
[45] Date of Patent: Sep. 3, 1996

[54] METHOD OF MONITORING FLUIDS ENTERING A WELLBORE

[75] Inventors: Robert E. Maute, Richardson; Laird B. Thompson, Dallas; Adam Bednarczyk, Carrolton; David Symmons, Dallas, all of Tex.

[73] Assignee: Mobil Oil Corporation, Fairfax, Va.

[21] Appl. No.: 383,028

[22] Filed: Feb. 2, 1995

[51] Int. Cl.$^6$ .............................. E21B 47/00; G01V 3/18
[52] U.S. Cl. ................... 73/152.02; 73/152.12; 73/152.29; 166/250.01
[58] Field of Search .................. 73/155, 153, 152, 73/154, 61.44; 166/250

[56] References Cited

U.S. PATENT DOCUMENTS

| | | | |
|---|---|---|---|
| 2,936,614 | 5/1960 | Godbey | 73/155 |
| 2,955,463 | 10/1960 | Godbey | 73/152 |
| 3,113,455 | 12/1963 | Sloan et al. | 73/155 |
| 3,123,709 | 3/1964 | Caldwell et al. | 250/43.5 |
| 3,246,180 | 4/1966 | Keeney | 307/118 |
| 3,363,457 | 1/1968 | Ruehle et al. | 73/154 |
| 3,454,085 | 7/1969 | Bostock | 166/66 |
| 3,603,145 | 9/1971 | Morris | 73/155 |
| 3,776,032 | 12/1973 | Vogel | 73/155 |
| 4,192,380 | 3/1980 | Smith | 166/250 |
| 4,286,461 | 9/1981 | Bres et al. | 73/155 |
| 4,435,978 | 3/1984 | Glatz | 73/155 |
| 4,501,323 | 2/1985 | Lively et al. | 166/250 |
| 4,641,724 | 2/1987 | Chow et al. | 181/104 |
| 4,791,797 | 12/1988 | Paske et al. | 73/152 |
| 4,811,598 | 3/1989 | Dillier et al. | 73/154 |
| 4,928,758 | 5/1990 | Siegfried, II | 166/66 |
| 4,974,446 | 12/1990 | Vigneaux | 73/155 |
| 5,062,482 | 11/1991 | Graham | 166/250 |
| 5,068,531 | 11/1991 | Allen et al. | 250/269 |
| 5,198,770 | 3/1993 | Decorps et al. | 324/367 |
| 5,353,873 | 10/1994 | Cooke, Jr. | 166/253 |
| 5,363,696 | 11/1994 | Cardellini et al. | 73/61.44 |

*Primary Examiner*—Hezron E. Williams
*Assistant Examiner*—J. David Wiggins
*Attorney, Agent, or Firm*—Ronald A. Bleeker; Malcolm D. Keen

[57] ABSTRACT

In a borehole logging tool, a hot wire or hot film anemometer measures fluid flow entering or exiting the borehole at the wall of the borehole. The logging tool has open sensing pads mounted on the arms to place the sensor pads at the wall. The sensor pads are open to fluid flow to provide minimum disruption of flow. Other sensors measure flow direction, capacitance, and temperature.

33 Claims, 5 Drawing Sheets

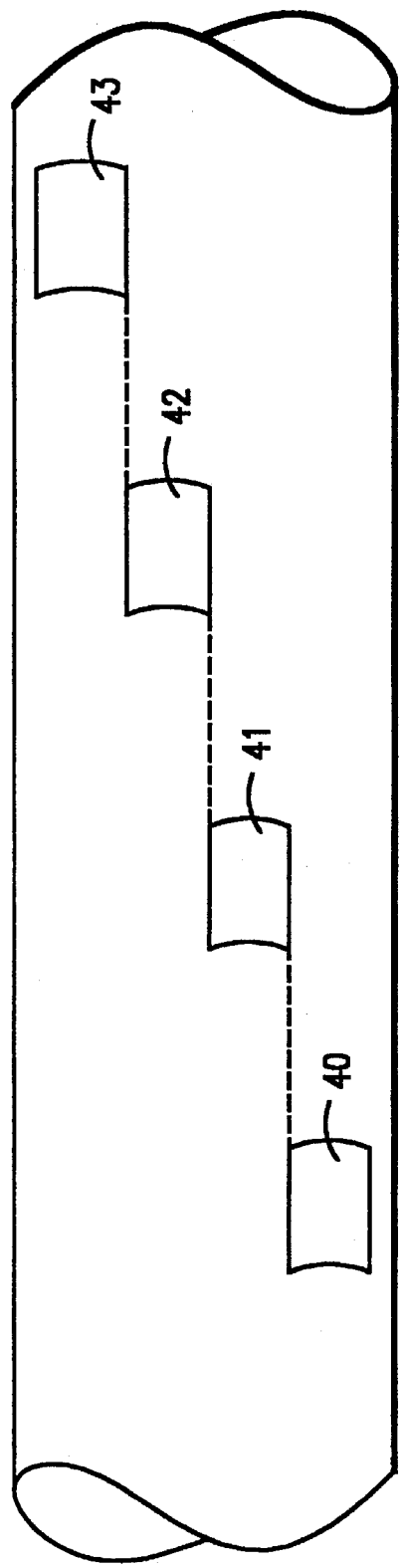
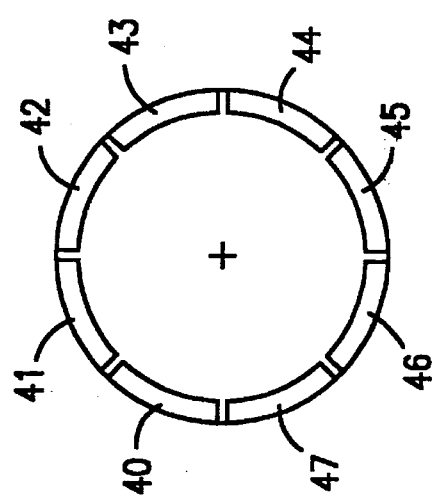
FIG. 5
FIG. 5A

METHOD OF MONITORING FLUIDS ENTERING A WELLBORE

BACKGROUND OF THE INVENTION

This invention relates to measuring the location, fluid type, and flow rate of fluids entering a wellbore.

In current practice, measurements are made in the central portion of the wellbore cross-section, such as of spinner rotation rate, fluid density and dielectric constant. These data are then interpreted in an attempt to determine the flow rate at any point along the borehole. Influx (or exit) rate over any interval is then determined by subtracting the flowrates at the two ends of the interval. However, in deviated and horizontal wells with multiphase flow, and also in some vertical wells such methods frequently give erroneous results due to the complex flow patterns within the wellbore giving non-representative readings. All prior production logging measurements are made in these complex flow regimes in the central area of the borehole and yield non-representative results, or have other severe limitations.

The problem of measuring multi-phase flow in conventional production logging is well documented in the literature. Hill, A. D., Oolman, T., 1982, "Production Logging Tool Behavior in Two-Phase Inclined Flow", JPT, October, p. 2432-40 first described the problems using conventional tools in multiphase wells which are deviated more than two degrees from the vertical. They also describe the four main types of tools which are in use. These are referred to as spinner tools, percent-water tools, density tools and flow concentrating flowmeters. Branagan, P., Knight, B. L., Aslakson, J., Middlebrook, M. L., 1994, "Tests Show Production Logging Problems in Horizontal Gas Wells", Oil & Gas Journal, Jan. 10, p. 41-45; Kalman, J. S., 1993, "Biphasic Fluid Studies for Production Logging in Large-Diameter Deviated Wells", The Log Analyst, Nov-Dec., p. 6-10; DING, Z. X. Ullah, K. Huang, Y., 1994, "A Companion of Predictive Oil/Water Holdup Models for Production Log Interpretation in Vertical and Deviated Wellbores", SPWLA 35th Annual Logging Symposium Transactions, June paper; and Nice, S. B., 1993, "Production Logging in Horizontal Wellbores", 5th World Oil et al., Horizontal Well Technol. Int. Conf. (Houston) Proc., sect. 11, November, particularly discuss the problems of measuring multiple phase flow in horizontal or deviated wells. Zhu, D. Hill, A. D., 1988, "The Effect of Flow From Perforation on Two-Phase Flow: Implications for Production Logging"; Proceedings SPE Annual Technical Conference and Exhibition, SPE 18207, October, p. 267-275 show that under some conditions conventional production logs give misleading results even in vertical wells.

It is an object of the present invention to provide apparatus for, and a method of, measuring the flow at the borehole wall as it enters the wellbore and before it becomes mixed with another phase in a complex flow pattern. The invention can also be used to measure outflow (injection) rates and depths.

SUMMARY OF THE INVENTION

The present invention relates to measuring the location, fluid type and flowrate of fluids entering a wellbore at the wall of the borehole. A sensor pad is mounted on a logging tool such that the pad is adjacent to the borehole wall. Preferably, the sensor pad is mounted on an arm such as a centralizing arm that places the sensor in contact with the borehole wall. The sensor pad is open so that it has minimal resistance to flow to provide minimum disruption to the influx of fluids into the wellbore. The invention can also be used to measure the outflow of fluids, such as determining injection profiles of injection wells, or pressuring up inside casing and determining outflow location(s) to determine the depth of leaks.

A plurality of sensor pads are arranged azimuthally around the tool so that the entire borehole circumference, or a sizable fraction thereof, is covered by measurements. The sensor pads sense the influx of fluid while it is still in one phase as it flows into the wellbore before it combines with the existing fluids and possibly other phases in the borehole to form complex flow patterns.

Other configurations of sensors could be used, such as a single pad being rotated azimuthally around the borehole wall, or a single large sensor that senses the entire circumference of the borehole.

Another advantage is that the location of the pad measuring the flux is known and with a tool orientation package would indicate the azimuthal location of flux, which is useful in various applications.

In accordance with other aspects of the invention, sensors to measure the location, fluid type, flow rate, and flow direction of fluids entering the wellbore are provided.

The invention obviates problems in the prior art by measuring the flow at the borehole wall as fluid enters the wellbore and before it becomes mixed with another phase into a complex flow pattern. Virtually all influx into the wellbore is one phase at the point of entry. Generally, if different fluids are produced in a borehole, they are produced at different depths. Very seldom in practice will the fluids passing into the borehole be two different fluids mixed together at the same exact depth. By measuring flow entering at the borehole wall, the problems of measuring multiple phase flow are minimized.

The foregoing and other objects, features and advantages of the invention will be better understood from the following more detailed description and appended claims.

SHORT DESCRIPTION OF THE DRAWINGS

FIG. 5 shows the sensor pads displaced longitudinally along the logging tool;

FIG. 5A is an end view of the logging tool with the sensors displaced azimuthally around the borehole.

DESCRIPTION OF THE PREFERRED EMBODIMENT

Figure 1:
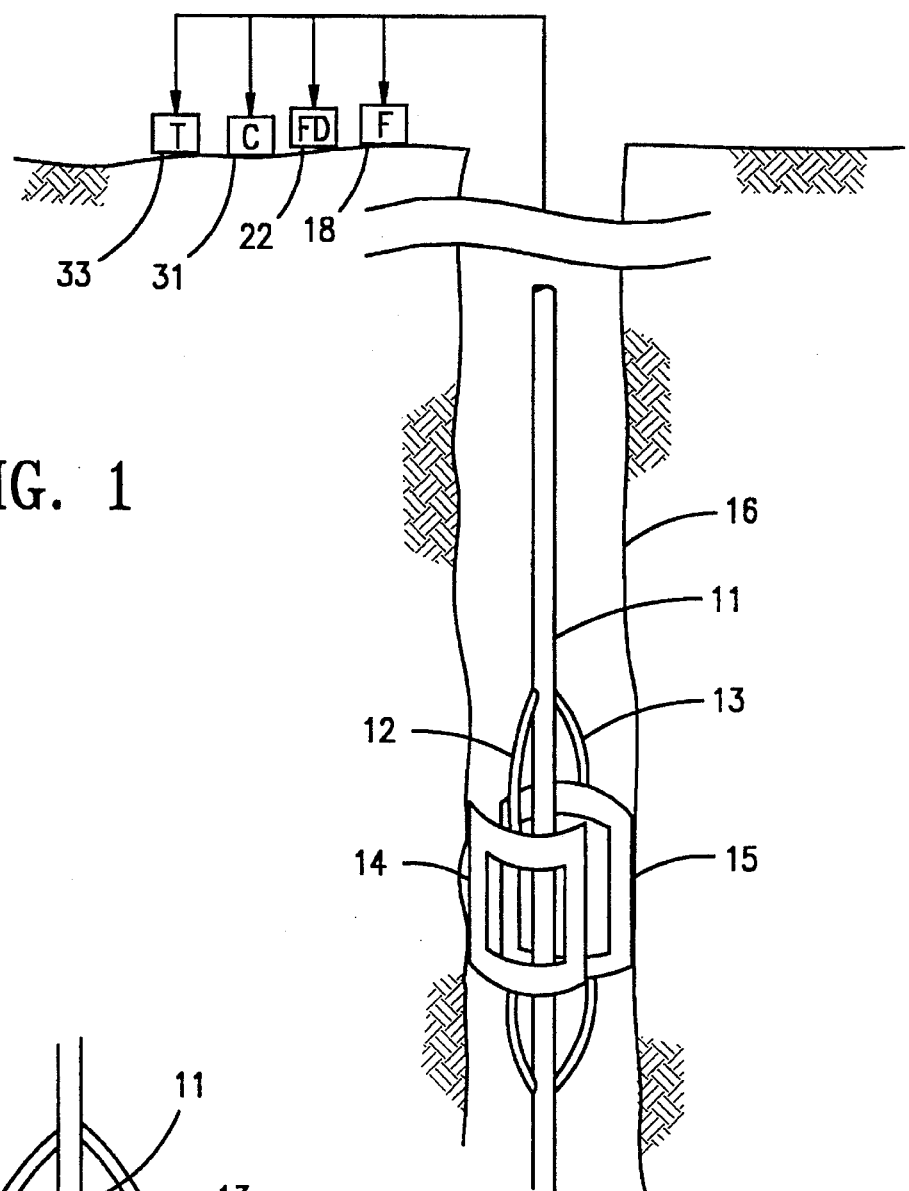
FIG. 1 shows the sensor pads of the present invention mounted on a logging tool.
Figure 1A:
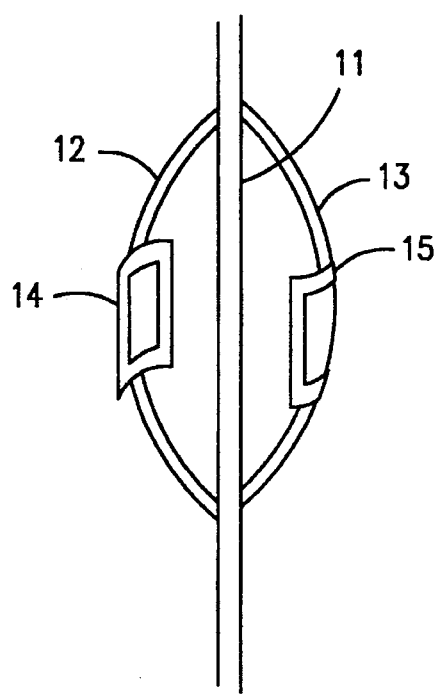
FIG. 1A shows a different view of the logging tool.

Referring to FIG. 1, a logging tool has a tool body 11 and a plurality of centralizing arms, or bow springs or the like, with the arms 12 and 13 being shown. Sensor pads, including pads 14 and 15, are positioned on each of the arms. By providing a plurality of sensor pads arranged azimuthally around the borehole, the entire borehole circumference is covered by the sensors. The sensor pads are small enough to allow passage of the tool through the tubing at the top of the well before the tool enters the production zone where the arms 12 and 13 push the sensor pads into contact with the wall of the borehole.

Each of the sensor pads 14, 15 is open, thereby permitting free flow of borehole fluid through the sensors.

Figure 2:
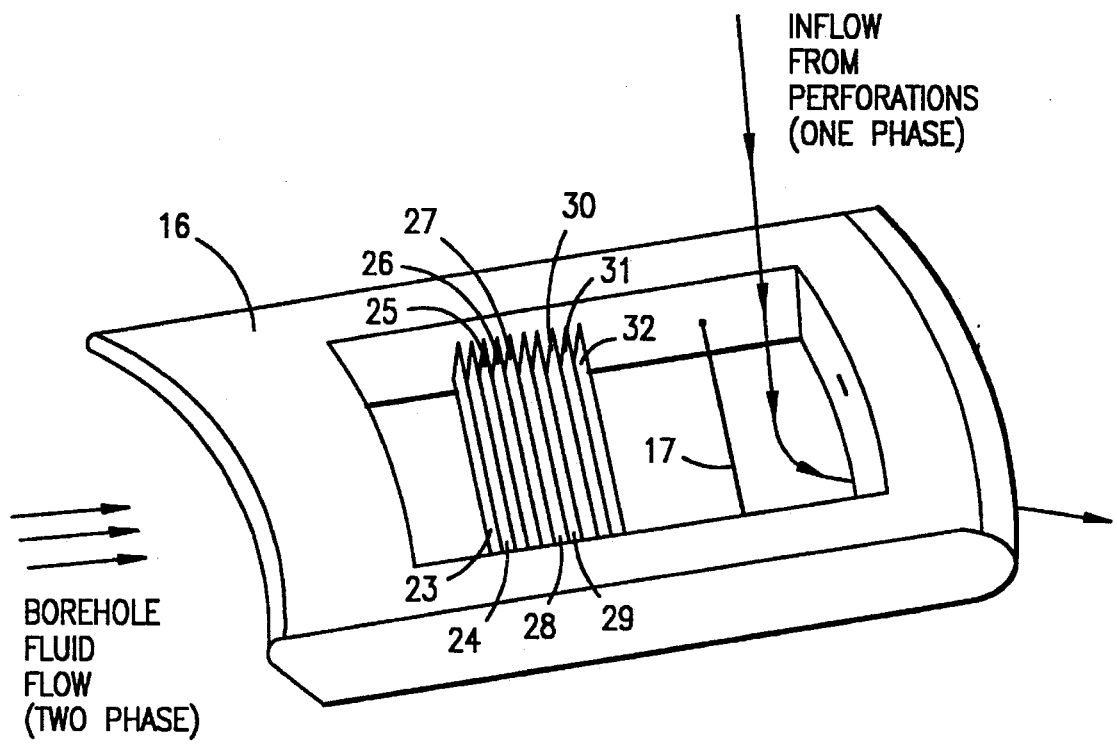
FIG. 2 shows the sensor pad in more detail.

FIG. 2 shows one embodiment of the sensor pad. It includes an end shield plate 16 which is of the same radius as the interior of the casing. The flow sensor includes a hot wire anemometer, which includes a resistance wire probe 17. Alternatively, a thin film anemometer or a thermopile or similar device can be used for flow measurement. The anemometer measuring circuitry 18 (FIGS. 1 and 3) measures the cooling effect of the fluid entering the borehole on the resistance wire probe 17. Consequently, the current passing through the probe 17 is a measure of the fluid velocity of the borehole liquid at the wall of the borehole. The heat loss from the wire probe 17 depends upon the mass velocity and the specific heat of the fluid which are taken into account when calibrating the instrument 18.

The center section of the sensor pad is open for easy flow of fluid therethrough with only the small diameter of the hot wire anemometer probe 17 and some pad edge effects, offering flow resistance. There is no significant disruption to the flow rate by the measurement sensor probe 17.

Capacitor plates 23–32 are also open to influxing fluid. This allows measurement of the dielectric constant of the influxing fluid to distinguish water from hydrocarbon, and possibly oil from gas. The measurement of capacitance is indicated by capacitance indicator 31 (FIG. 1).

Figure 2A:
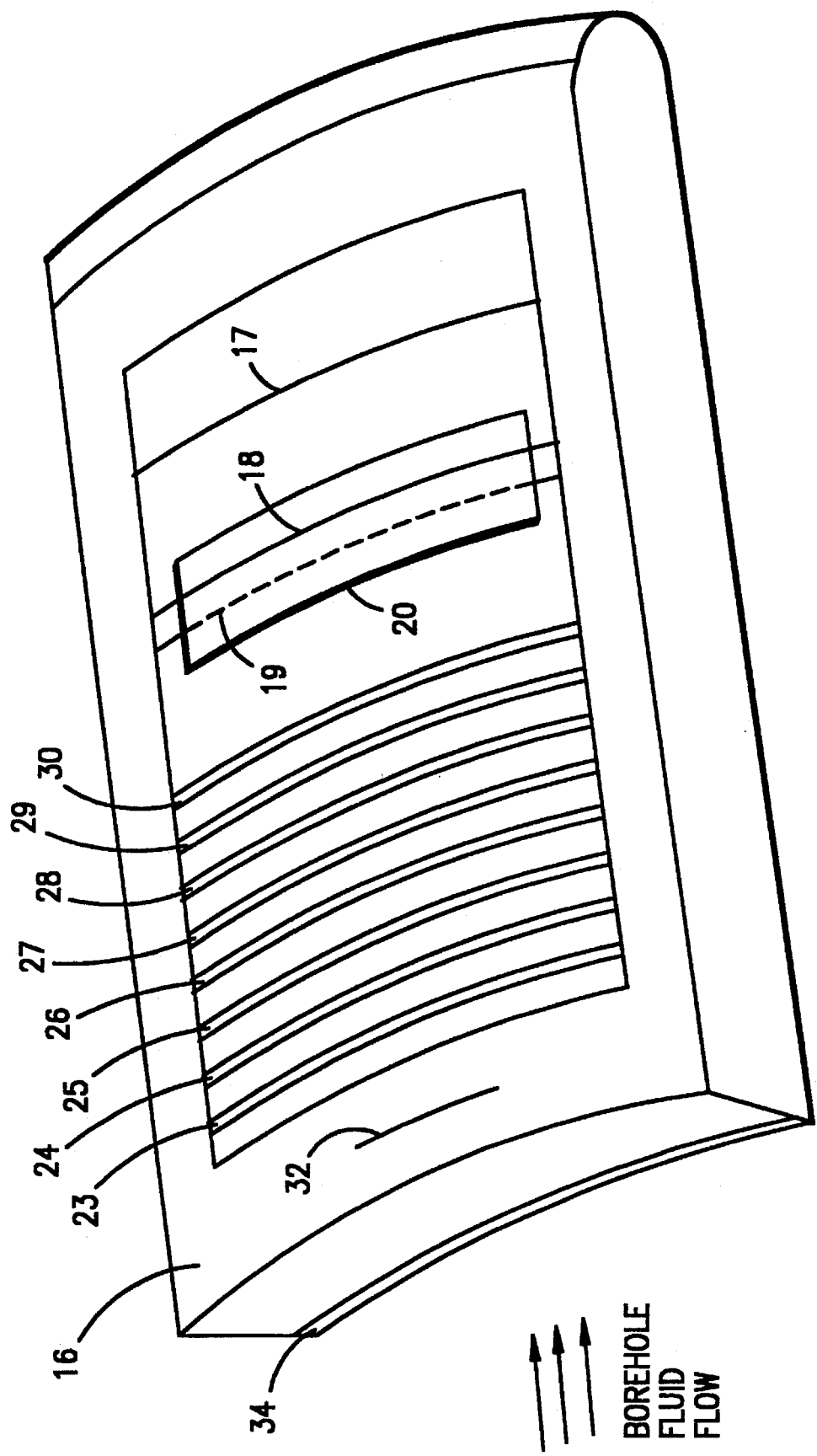
FIG. 2A shows a modification of FIG. 2.

As shown in FIG. 2A, a flow direction sensor may be included, and in this embodiment (other embodiments could be used) includes two hot wire anemometer probes 18 and 19 with a small plate 20 separating them. The plate 20 is perpendicular to the influxing fluid flow to prevent the downstream anemometer probe from being cooled as much as the upstream probe. The difference in cooling indicates flow direction at the indicator 22.

A thermocouple 32 is mounted on the sensor pad to provide an indication of temperature in the indicator 33 (FIG. 1). The temperature helps distinguish gas from oil influx.

The flow detector probe 17 presents no significant disruption to the flowrate. The other sensors also offer minimal disturbance to the flowrate though they are not sensitive to flowrate, so any reasonable disruption is insignificant. A backpad 34 minimizes any effects from existing flowing fluids in the borehole on the measurements. Also, matching the radii of the casing and the sensor pads minimizes any rideover on the outer side of the sensor pad of existing fluids in the wellbore. Also, because fluid is generally influxing, the external pressure is greater than that in the wellbore, or the fluid would not enter. Because of this, the influxing fluid forces out most or all of the existing borehole fluid from the pad's sensing volume.

Figure 3:
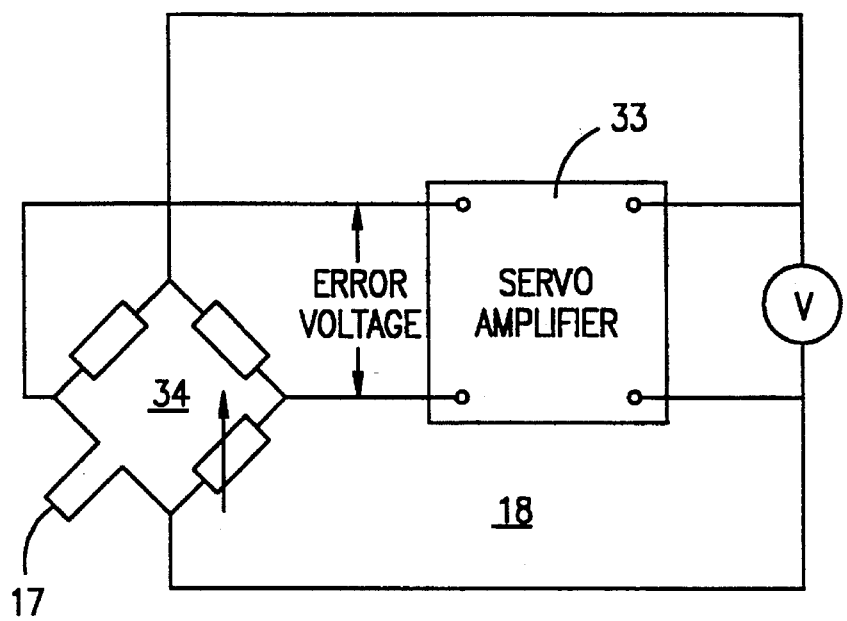
FIG. 3 depicts a typical hot wire anemometer measuring circuit.

FIG. 3 shows a typical hot wire flow measuring circuit. Hot-wire and hot-film anemometers are normally operated in the constant temperature (CTA) mode as shown in FIG. 3. The resistance of the probe and, therefore, its temperature is maintained constant. The output bridge voltage is related to the heat transfer from the probe and this in turn is related to the fluid parameter under consideration (usually the velocity). The bridge is maintained in balance by a voltage from the servo-amplifier 33. Any change in the resistance of the probe 17 due to a change in the heat transfer will cause an unbalance in the bridge 34 and simultaneously introduce an error voltage at the input to the servo-amplifier. This error voltage is highly amplified and fed back into the bridge to maintain balance via adjusted bridge voltage and sensor current. The probe temperature is thereby kept essentially constant and the thermal inertia of the probe is minimized. Due to the very high gain in the amplifier and the small mass of the sensor the system is capable of responding to very rapid fluctuations in velocity.

Figure 4:
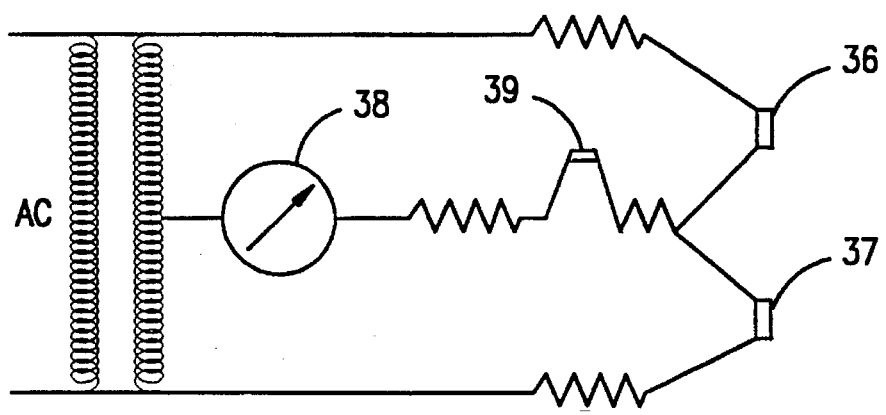
FIG. 4 depicts a heated thermopile measuring circuit.

Other circuits may also be used. The circuit of FIG. 3 is operated in the constant temperature mode, as normally used with hot-wire and hot-film anemometers. The resistance of the hot-wire (or hot-film) which varies with its temperature, is maintained constant. The basic circuit is a Wheatstone bridge, with the hot-wire (film) being one arm. As fluid flows over the hot-wire cooling it and reducing its temperature and resistance, a servo-amplifier increases bridge voltage and current through the hot-wire heating the wire back to its set temperature. The new bridge voltage is then related to the fluid velocity. As an alternative, the thermopile measuring circuit of FIG. 4 can be used. Thermocouples 36 and 37 are heated by alternating current. The changing DC output of the thermopile due to cooling by fluid flow is indicated by the meter 38. To compensate for changes in ambient temperature, an unheated thermocouple 39 is in the DC measuring circuit. A change in ambient temperature develops voltage changes in all thermocouples with the voltage in thermocouple 39 being equal and opposite to that in thermocouples 36 and 37. Other flow measuring sensors may also be used, as well as other circuitry.

In some applications, it is important to determine the azimuthal positions of flux of the fluid entering or flowing out of the borehole. FIGS. 5 and 5A show a plurality of sensor pads 40–47 arranged azimuthally around the borehole. The entire borehole circumference is covered by sensor pads and the pads are spaced longitudinally from one another to detect flow in different segments around the circumference of the borehole.

Alternatively, a single pad may be used which is rotated azimuthally around the borehole by a motor. In some boreholes it may possible to use a single sensor pad covering the entire circumference of the borehole.

Figure 6:
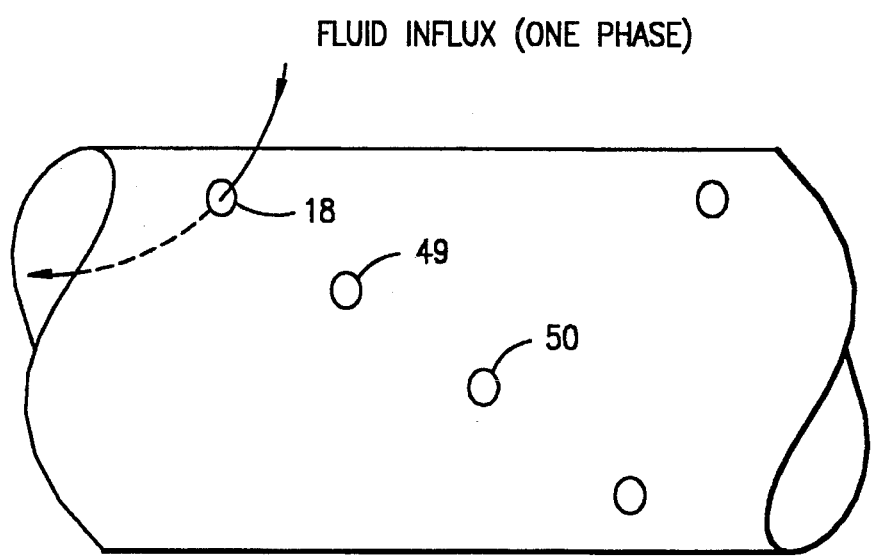
FIG. 6 depicts the casing showing fluid influxing the casing in a single phase.

FIG. 6 depicts the casing in the borehole with perforations such as at 48, 49 and 50. Fluid entering the borehole through one of the perforations is in a single phase which can be accurately measured by the logging tool of the present invention.

Other embodiments are within the true spirit and scope of the invention. The appended claims are, therefore, intended to cover all such embodiments.

While a particular embodiment of the invention has been shown and described, various modifications are within the true spirit and scope of the invention. The appended claims are, therefore, intended to cover all such modifications.

What is claimed:

1. A borehole logging tool comprising:

a tool body;

a sensor pad, mounted on said tool body to be near said borehole wall said sensor pad being open with an opening for allowing fluid flow therethrough said sensor pad from a surrounding earth formation into said borehole for measuring a parameter of the fluid at the wall of said borehole.

2. The logging tool recited in claim 1 wherein the parameter is the flow rate of the fluid entering or exiting the borehole.

3. The logging tool recited in claim 1 wherein the parameter is fluid type of the fluid entering or exiting the borehole.

4. The logging tool recited in claim 1 wherein said sensor pad includes a hot wire anemometer for measuring a parameter of fluid entering or exiting the borehole at the wall of said borehole.

5. The logging tool recited in claim 1 wherein said sensor pad includes a hot film anemometer for measuring a parameter of fluid entering or exiting the borehole at the wall of said borehole.

6. The logging tool recited in claim 1 wherein said sensor pad includes a heated thermopile for measuring fluid flow velocity entering or exiting the borehole at the wall of said borehole.

7. The logging tool recited in claim 1 wherein said sensor pad includes a capacitor open to influxing or exiting fluid for measuring the dielectric constant of said fluid.

8. The logging tool recited in claim 1 wherein said sensor pad includes a temperature sensor positioned to measure local ambient temperature.

9. The logging tool recited in claim 1 wherein said sensor pad includes a flow direction sensor to indicate whether flow is egressing or ingressing said borehole.

10. The logging tool recited in claim 9 wherein said direction sensor includes two hot wire anemometers, and a plate separating said anemometers, one disposed upstream and the other disposed downstream of the egressing or ingressing fluid flow, said plate being perpendicular to the influxing or outfluxing flow to prevent the downstream anemometer from being cooled as much as the upstream anemometer, the difference in the signals from said anemometers indicating direction of fluid flow, namely into or out of the borehole.

11. The logging tool recited in claim 1 comprising: a plurality of arms, a sensor pad mounted on at least one of said arms.

12. The logging tool recited in claim 1 wherein said arms are centralizing bow arms.

13. The logging tool recited in claim 1 wherein said sensor pad has a curved shape with the same radius as one-half the inside diameter of said borehole.

14. The logging tool recited in claim 1 wherein the center section of said sensor pad is with an opening for allowing fluid flow therethrough.

15. The logging tool recited in claim 1 further comprising:

a shield on said sensor pad that is on the end of said sensor pad that is upstream of the fluid flowing in the center of said borehole to minimize effects from fluids flowing in the center of said borehole.

16. The logging tool recited in claim 1 further comprising:

a plurality of sensor pads mounted azimuthally around the circumference of said tool.

17. A method of measuring fluid flow in a borehole bounded by a wall casing, comprising:

traversing said borehole with a tool body having a fluid flow sensor pad attached thereto which is capable of placement along circumference of said casing; and shielding the measurement of fluid flow entering or exiting the borehole at the wall of said borehole with an end shield plate attached beside said sensor pad to minimize effects from fluids flowing in the center of said borehole, where said end shield plate has a curvature radius matching the interior radius of said casing.

18. The method recited in claim 17 wherein the parameter is flowrate.

19. The method recited in claim 17 wherein the parameter is fluid type entering or leaving the borehole.

20. The method recited in claim 17 wherein the step of measuring includes placing the probe of a hot wire anenometer in the fluid flowing into or out of the borehole at the wall of said borehole.

21. The method recited in claim 17 wherein the step of measuring includes placing the probe of a hot film anenometer in the fluid flowing into or out of the borehole at the wall of said borehole.

22. The method recited in claim 17 wherein the step of measuring includes placing the probe of a thermopile in the fluid flowing into or out of the borehole at the wall of said borehole.

23. The method recited in claim 17 further comprising:

measuring the capacitance or dielectric constant of the fluid flowing into or out of the borehole at the wall of said borehole to distinguish different fluids.

24. The method recited in claim 17 further comprising:

measuring the temperature of the fluid flowing into or out of the borehole at the wall of said borehole to help distinguish gas from oil in the fluid influx or outflux.

25. The method recited in claim 17 further comprising:

measuring the direction of flow of fluid flowing into or out of the borehole at the wall of said borehole.

26. The method recited in claim 17 further comprising:

shielding the measurement of fluid flow entering or exiting the borehole at the wall of said borehole to minimize effects from fluids flowing in the center of said borehole.

27. The method recited in claim 17 further comprising:

measuring a parameter of said fluid with a plurality of sensors spaced azimuthally around the circumference of said borehole.

28. The method recited in claim 17 wherein the step of measuring is performed with a single sensor rotated by a motor azimuthally around said borehole.

29. The method recited in claim 17 wherein the step of measuring is performed by a sensor pad applied to the borehole wall and covering the entire circumference of said borehole.

30. The method recited in claim 17 or claim 28 wherein the step of measuring determines the parameter of said fluid as a function of the azimuthal position of flux in said borehole.

31. A borehole logging tool comprising:

a tool body;

a sensor pad, mounted on said tool body to be near said borehole wall for measuring a parameter of the fluid at the wall of said borehole;

a flow direction sensor to indicate whether flow is egressing or ingressing said borehole, said direction sensor including:

two hot wire anemometers, and a plate separating said anemometers, said plate being perpendicular to the influxing flow to prevent the downstream anemometer from being cooled as much as the upstream anemometer, the difference in the signals from said anemometers indicting direction of fluid flow, namely into or out of the borehole.

32. A borehole logging tool comprising:

a tool body;

a sensor pad, mounted on said tool body to be near said borehole wall for measuring a parameter of the fluid at the wall of said borehole; and a shield on said sensor pad that is on the end of said sensor pad that is disposed at a position upstream of the fluid flowing in the center of said borehole to minimize effects from fluids flowing in the center of said borehole.

33. A method of measuring fluid flow in a borehole comprising:

traversing said borehole with a tool body; and measuring a parameter of said fluid at the wall of said borehole, said step of measuring being performed with a sensor pad having an open center to allow fluid flow therethru which provides minimal disruption to fluid flow passing from a surrounding earth formation into said borehold.

* * * * *